(12) United States Patent
Eggiman-Ketter et al.

(10) Patent No.: US 10,069,964 B2
(45) Date of Patent: *Sep. 4, 2018

(54) METHOD FOR HANDLING A CALL, SOFTWARE PRODUCT, AND DEVICE

(71) Applicant: Unify GmbH & Co. KG, Munich (DE)

(72) Inventors: Michael Eggiman-Ketter, Newmarket (CA); James Murison, Markham (CA)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,146

(22) Filed: Jun. 27, 2017

(65) Prior Publication Data
US 2017/0302788 A1    Oct. 19, 2017

Related U.S. Application Data

(63) Continuation of application No. 15/189,240, filed on Jun. 22, 2016, now Pat. No. 9,723,135.

(30) Foreign Application Priority Data

Jul. 31, 2015    (EP) .................................... 15002286

(51) Int. Cl.
| | |
|---|---|
| H04M 1/24 | (2006.01) |
| H04M 3/08 | (2006.01) |
| H04M 3/22 | (2006.01) |
| H04M 5/00 | (2006.01) |
| H04M 3/00 | (2006.01) |

(Continued)

(52) U.S. Cl.
CPC ..... *H04M 3/2218* (2013.01); *H04M 3/42059* (2013.01); *H04M 3/42102* (2013.01); *H04M 3/5166* (2013.01); *H04M 3/58* (2013.01)

(58) Field of Classification Search
CPC ............ H04L 65/1006; H04M 3/5175; H04M 3/5183; H04M 3/5191; H04M 3/523; H04M 3/2218; H04M 3/493; G06Q 30/016; G06Q 30/02
USPC ... 379/32.01, 32.05, 265.01, 265.02, 265.06, 379/265.11, 266.1, 309
See application file for complete search history.

(56) References Cited

U.S. PATENT DOCUMENTS

| | | |
|---|---|---|
| 5,719,927 A | 2/1998 | Hariu et al. |
| 6,687,241 B1 | 2/2004 | Goss |

(Continued)

FOREIGN PATENT DOCUMENTS

WO    2006135679 A2    12/2006

*Primary Examiner* — Binh Kien Tieu
(74) *Attorney, Agent, or Firm* — Buchanan Ingersoll & Rooney PC

(57) ABSTRACT

A method for handling calls to be moved within a system having an unmonitored domain and a monitored domain can include the step of upon first arrival of a call at said unmonitored domain, a context of said call based on a called number, a calling number, and any redirection number(s) included in said call can be provided. Another step of the method can include, for each movement of said call between said unmonitored domain and said monitored domain, providing a unique number to be temporarily used for said particular movement, based on said call context, while avoiding that said unique number is used to move any other call within the system at the same time. An apparatus for can be configured to facilitate performance of the method (e.g. communication system, a device, non-transitory memory, etc.).

20 Claims, 1 Drawing Sheet

(51) Int. Cl.
*H04M 3/42* (2006.01)
*H04M 3/51* (2006.01)
*H04M 3/58* (2006.01)

(56) References Cited

U.S. PATENT DOCUMENTS

| | | | |
|---|---|---|---|
| 6,731,609 B1 * | 5/2004 | Hirni | H04L 12/1813 |
| | | | 370/260 |
| 6,829,348 B1 | 12/2004 | Schroeder et al. | |
| 6,970,554 B1 | 11/2005 | Peterson et al. | |
| 7,864,941 B1 | 1/2011 | Bledsoe et al. | |
| 8,233,388 B2 * | 7/2012 | Zheng | H04L 63/105 |
| | | | 370/229 |
| 8,265,248 B2 * | 9/2012 | Raghav | H04M 3/5183 |
| | | | 379/142.07 |
| 8,494,152 B1 | 7/2013 | Roberts et al. | |
| 8,923,506 B1 | 12/2014 | Roberts et al. | |
| 9,088,656 B2 | 7/2015 | Mezhibovsky et al. | |
| 2007/0041527 A1 | 2/2007 | Tuchman et al. | |
| 2008/0049929 A1 | 2/2008 | Miloslaysky et al. | |
| 2008/0192730 A1 * | 8/2008 | Cai | H04L 12/66 |
| | | | 370/352 |
| 2008/0298560 A1 | 12/2008 | Purdy et al. | |
| 2009/0016506 A1 * | 1/2009 | Brown | H04M 3/2218 |
| | | | 379/112.01 |
| 2009/0202056 A1 * | 8/2009 | Raghav | H04M 3/5183 |
| | | | 379/142.04 |
| 2012/0195411 A1 * | 8/2012 | Srinivasa-Murthy | H04M 3/5166 |
| | | | 379/88.01 |
| 2012/0213357 A1 * | 8/2012 | Ryskamp | H04M 3/2281 |
| | | | 379/265.02 |
| 2012/0224676 A1 * | 9/2012 | Cai | H04L 12/66 |
| | | | 379/88.19 |
| 2012/0328084 A1 | 12/2012 | Raghav et al. | |
| 2014/0254786 A1 * | 9/2014 | Tendick | H04M 3/5175 |
| | | | 379/265.03 |
| 2014/0270142 A1 | 9/2014 | Bischoff et al. | |
| 2015/0117624 A1 * | 4/2015 | Rosenshine | H04M 3/42042 |
| | | | 379/142.04 |
| 2015/0120904 A1 * | 4/2015 | Shaffer | H04L 67/148 |
| | | | 709/224 |
| 2016/0080567 A1 | 3/2016 | Hooshiari et al. | |
| 2016/0373580 A1 * | 12/2016 | Cutajar | H04M 3/42068 |

* cited by examiner

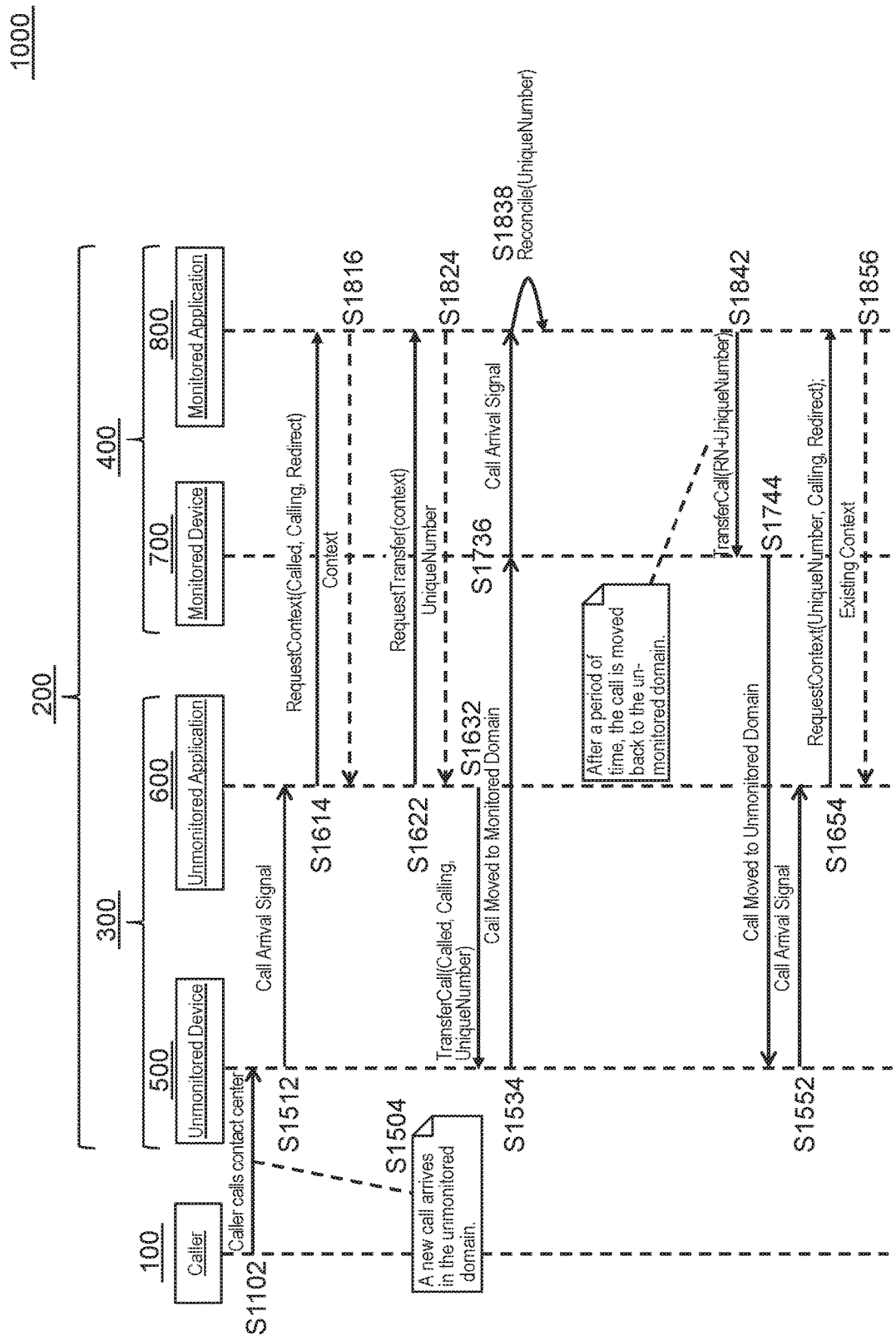

METHOD FOR HANDLING A CALL, SOFTWARE PRODUCT, AND DEVICE

CROSS-REFERENCE TO RELATED APPLICATIONS

The present application is a continuation application of U.S. patent application Ser. No. 15/189,240, which claims priority to European Patent Application No. 15002286.1, which was filed on Jul. 31, 2015. The entirety of European Patent Application No. 15002286.1 is incorporated by reference herein.

FIELD OF THE INVENTION

The present invention relates to a method of handling a call. The invention also relates to a corresponding software product stored on non-transitory memory such that it is executable by a processor of a device and a device.

BACKGROUND OF THE INVENTION

It is known in the art that a call is tracked while being moved within a communications domain. Tracking is facilitated by monitoring the involved communication devices. For instance, as a call moves from a first device to a second device and then to a third device, if it is monitored it is possible to clearly identify that the call that left the first device is the same call that eventually arrives at the third device, and not another call that was made to the third device by a different party at the same time that the original call was being moved to the third device. Thus, it is usually required to monitor all communication devices to ensure that the call is properly tracked which can require higher costs for monitored devices instead of unmonitored devices.

If any device is not monitored this could result in a call being divided into multiple contexts. The call context may comprise metadata around the call, e.g., originally called number, data collected from the caller by a voice response application, etc. If the call information is split amongst multiple contexts, the data cannot easily be amalgamated. If a caller provides their customer number to an interactive voice response (IVR) application, which is unmonitored, and this is associated with a first call context, then when the call is transferred to a contact center agent at another device, with a second call context, it is not straightforward to determine that the two contexts are related. Therefore, the customer information that was previously found cannot be presented to the contact center agent.

The devices are monitored by a software application for call tracking purposes. In the case of a contact center, the devices typically monitored may be agent endpoints, and queuing points. If the device where a call is queued is not monitored, it is difficult to determine that a call that leaves the unmonitored device and arrives at a monitored device (e.g. the agent extension) is really the same call, or is another call that was placed directly (i.e., at the same time) to the agent extension. This also impacts the ability to track call statistics, for example.

It has been proposed that a unique number be used to identify calls moving between two monitored domains across an unmonitored domain (e.g., for networking between sites), or to transition from an unmonitored domain to a monitored domain (e.g., unmonitored IVR—Interactive Voice Response). Methods for identifying a call per se include the "Global Call ID" by Cisco, and the ISDN "Call Reference". Cisco's Global Call ID is used to associate multiple call segments within a call in a monitored domain, i.e., where the telephone switch has a context for the segments of the call. The ISDN Call Reference concept is similarly a call identifier for a particular monitored call segment when the call is associated with a trunk. However, these solutions are not designed for calls moving into an unmonitored domain.

SUMMARY OF THE INVENTION

An object of the present invention is to provide a method for handling a call, as well as respective software product stored in non-transitory memory, and a device, that can allow for the elimination or alleviation of the problems of the prior art mentioned above. In particular, it is an object of the present invention to provide a method for handling a call, as well as respective software product and device. This can allow calls to be tracked while moving between telephony monitored and unmonitored domains via Session Initiation Protocol (SIP) trunks. Furthermore, an object of the present invention is to provide a method for handling a call, as well as respective software product and device, allowing calls to be moved into, out of or across an unmonitored domain without being divided into multiple contexts, e.g. ensuring a single unique context per call.

One aspect of the invention is a method for handling calls to be moved within a system having an unmonitored domain and a monitored domain. The method comprises the steps:
upon first arrival of said call in said system, providing a call context of said call based on a called number, a calling number, and any redirection number(s) included in said call, and
for each movement of said call between said unmonitored domain and said monitored domain, providing a unique number to be temporarily used for said particular movement, based on said call context, while avoiding that said unique number is used to move any other call within the system at the same time.

A call in the sense of the present invention may be a telephone call, but may also cover other kinds of calls, in particular any voice and/or video calls. An unmonitored domain may comprise one or more unmonitored devices, and a monitored domain may comprise one or more monitored devices, said devices being any kind of telecommunications, in particular telephony, resources. That means that the article "a" or "an" in regard of some item is not used in the sense of "one single" but in the bare sense of an indefinite article, e.g., one such item or more than one of such item may be present. However, the invention may become clearer and more concise if explained with a single one of each item while it still may work with a plurality of each item unless explicitly stated otherwise. The unmonitored domain and the monitored domain may be understood to belong to one same overall domain being assigned to a called party of the call. A system may be such overall domain and may contain any device or configuration to be able to perform call handling, processing, management, etc. A call context in the sense of the present invention is understood to comprise metadata around the call, e.g., originally called number, data collected from the caller by a voice response application, etc.

This aspect of the present invention makes use of both a called number and information in a header such as the SIP diversion header to uniquely identify a call moving within the system thus allowing the context to be maintained as the call moves between monitored and unmonitored devices that are connected via a SIP trunk. In other words, the method of this aspect of the present invention can handle both calls moving from an unmonitored domain to a monitored domain while maintaining the call context, and also calls that are moved from the monitored domain back to an unmonitored domain, again while maintaining the call context. The unique number can be utilized in a way to help ensure that the same number is not being used to move any other call within the system at the same time. This can permit the call context of the moved call to be unambiguously determined. In other words, the unique number may be understood as a temporary, distinct call movement identifier. Here, the unique number is to be clearly distinguished from a call identifier. A call identifier uniquely identifies the call for the lifecycle of the call, and can be used to access the call context (from the monitored application) throughout the lifecycle of the call. In contrast, the "unique number" is used to move the call for a particular movement operation only and can subsequently be discarded. The unique number is only associated with the call identifier for the time where the call is being moved. By avoiding that the unique number is used to move any other call within the system at the same time, it is ensured that the unique number is not used within the system at the same time when the unique number is used for the call. The number could then be re-used for the movement of other calls, movement of other calls while the call for which the unique number was initially used for a move of that call is still ongoing but not longer being moved, or even for later movements of the same call that may occur after the initial move of that call for which the unique number was initially used.

According to a preferred embodiment of this aspect, if said call is to be moved from said unmonitored domain to said monitored domain, said providing of a unique number includes:

requesting said unique number from said monitored domain by passing in said provided call context, creating said unique number at said monitored domain based on said passed-in call context, transmitting said unique number to said unmonitored domain, and receiving said unique number at said unmonitored domain, and said using of the unique number includes adding said unique number to a diversion header of said moved call.

This embodiment can be understood to develop a first specific case of the method of this aspect, referring to a first call transfer direction. It will be clear that an "if" condition in the method may indicate that a step of judging whether or not the respective condition is met is executed, and the step following the respective "if" condition is executed only in case the judging is to the affirmative.

According to another preferred embodiment of this aspect, if said call is moved from said monitored domain to said unmonitored domain, said providing a unique number comprises creating said unique number at said monitored domain, and appending said unique number to a route prefix of said moved call, said using of the unique number comprises requesting said call context from said monitored domain based on said unique number, calling number, and redirection number(s) included in said call, upon arrival of said call at said unmonitored domain, and the method further comprises a step of providing said requested call context in the unmonitored domain.

This embodiment can be understood to develop a second specific case of the method of this aspect, referring to a second call transfer direction.

In this embodiment, said requesting a call context from said monitored domain may comprise:

passing in said unique number, calling number, and redirection number(s) included in said call, to said monitored domain, and said providing said requested call context may comprise:

identifying said unique number at said monitored domain, selecting existing call context of said call allocated to said unique number transmitting said selected existing call context, to said unmonitored domain, and receiving said transmitted call context at said unmonitored domain.

It will be noted that the identifying and selecting steps may be understood as partial aspects of the step of using said unique number.

In any case, the unique number is generated and assigned by the monitored application and is used by the unmonitored application to move the call into the monitored domain, and vice versa, such that the call can be identified. As a result, the call context may be maintained so that the information contained may be maintained and may easily be accessed.

According to a preferred embodiment of this aspect, the unique number can be discarded as the moving is completed, or after the moving is completed. Thereby, the unique number is used temporarily to move the call around, but may be used later again. It is however not necessarily the case that the same unique number used for moving a call in one direction is used again when that same call is moved back later. To the contrary, when moving the call back later, a different unique number may be provided. The unique number can be used to move any call between two resources, but can only be used for moving one call at a time.

According to a preferred embodiment of this aspect, said providing a call context upon first arrival of said call in said system comprises creating said call context at said monitored domain based on said called number, calling number and redirection number(s) included in said call.

According to a preferred embodiment of this aspect, said call is first received in said unmonitored domain, and said providing a call context upon first arrival of said call in the system comprises:

requesting said call context from said monitored domain by passing in said called number, calling number, and redirection number(s) included in said call, creating said call context at said monitored domain based on said passed-in called number, calling number and redirection number(s), transmitting said created call context to said unmonitored domain, and receiving said transmitted call context at said unmonitored domain.

Therefore, the monitored application will create a call context based on the provided information such as a called number, a calling number, and any redirection number(s) included in said call. This will assign a call identifier to the call within the scope of the monitored application, and the monitored application will ensure that this same call identifier is used for the call as it moves from the unmonitored domain to the monitored domain, and back to the unmonitored domain, if applicable, by linking it with the unique number created for each movement.

According to a preferred embodiment of this aspect, the method comprises a step of reconciliation at said monitored domain, based on said unique number, upon arrival of said call from said unmonitored domain at said monitored domain. A reconciliation in the sense of the present invention may include determining the call context for the call (e.g., looking up the previously assigned call context, based on the information signalled when the call arrived, including the unique number generated for the move of the call). The step of reconciliation is preferably executed by the monitored application which is typically running on a separate execution environment (e.g. a processor of a device executing software stored in non-transitory memory defining the method by which the reconciliation and/or monitoring can be performed by the device) but may alternatively be running on the monitored device or any other instance in the monitored domain.

According to a preferred embodiment of this aspect, the method is executed by an unmonitored application implemented in said unmonitored domain for controlling an unmonitored device and a monitored application implemented in said monitored domain for controlling a monitored device, said call being moved between said unmonitored device and said monitored device. It should be understood that each application may be run on a device (e.g. a communication device in the domain to which the application is assigned or is present)

In this preferred embodiment, said unmonitored device is or comprises a SIP trunk and/or said monitored device is or comprises a user extension.

According to a preferred embodiment of this aspect, said diversion header is formed as a SIP diversion header.

According to a preferred embodiment of this aspect, said system is or comprises or belongs to a telecommunications exchange (e.g. a private branch exchange (PBX), a switch, or server (e.g. a telecommunications server having at least one processor and non-transitory memory).

In an alternative embodiment, the monitored and unmonitored domains may be distributed over different entities.

Another aspect of the present invention is a software product for handling a call. The software product is stored on a non-transitory computer-readable medium, and is preferably directly loadable into an internal memory of a computer, and comprising program code that defines a method to be performed by the device that executes the program cod. The method defined by the code can include the steps of a method of any of method disclosed herein when said software product is executed by said computer. Said computer preferably comprises or is embodied by or included in a telephone, mobile phone, smart phone, personal digital assistant (PDA), server (preferably a telephone server or telecommunications server), exchange, gateway, internet telephony service provider (ITSP), PBX, desktop computer, portable computer, tablet, or the like.

It will be understood that the program code may be adapted to alter or extend call handling/managing software existing on said computer.

Another aspect of the present invention is a device for handling a call. The device is implemented in or as a system having at least one unmonitored domain and at least one monitored domain, and may comprise:

means for providing a call context of said call upon first arrival of said call at said system, based on a called number, a calling number, and any redirection number(s) included in said call, means for providing a unique number to be temporarily used for each movement of said call between said unmonitored domain and said monitored domain, based on said call context, and means for ensuring that said unique number is not used to move any other call within the system at the same time.

The device can be adapted to execute a method as described herein. Adaptation may preferably be provided by implementation of a program code included in the software product as mentioned above.

In a preferred embodiment of the device of this aspect, the device comprises or is embodied by or included in at least one of an endpoint, a communication terminal, a communication device, a network node, a telephone, mobile phone, smart phone, PDA, server, preferably telephone server, exchange, gateway, ITSP, PBX, desktop computer, portable computer, tablet, or the like. In other words, the device may be one device of a type mentioned above, or a system of devices of same or different types as mentioned above. In the system, at least one device may belong to the unmonitored domain, and at least one other device may belong to the monitored domain.

The present invention may also be embodied by a computer program for handling a call, including instructions causing a computer executing the program via its processor to perform the steps of the afore-described method when said computer program is loaded in or executed by said computer, and by a digital data carrier having electrically readable control signals which are designed to operate with a programmable computer for handling a call, said control signals being designed and adapted to cause the computer to perform the steps of the afore-described method. Here, the computer may also be embodied by the device of the described aspect of the invention, a communication device, a server such as a collaboration server, call management server, conference server or the like, a workstation, a personal computer or the like.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

BRIEF DESCRIPTION OF THE DRAWINGS

Next, the invention is described referring to specific embodiments and referring to the accompanying drawing wherein the FIGURE, FIG. 1, is a sequence block diagram of a process according to an exemplary embodiment of the present invention.

DETAILED DESCRIPTION OF EXEMPLARY EMBODIMENTS

The invention will be described in detail with reference to a preferred exemplary embodiment, referring to the accompanying drawing. It is to be noted however that the drawing is purely schematic and not necessarily to scale. The drawing and descriptions are to illustrate at least one principle underlying the invention, not to limit the same in any way. The present invention is only limited by the appended claims.

Referring to the FIGURE, which is a sequence block diagram of a process 1000 according to an exemplary embodiment of the present invention, the process 1000 can involve a calling party's domain 100, and a called party's domain which is referred to as an overall domain 200, in the following. The called party is represented by a contact center environment, in the present example. A part of the process 1000 is on the side of the called party's domain, or overall domain 200. The overall domain 200 comprises an unmonitored domain 300 and a monitored domain 400. The unmonitored domain 300 comprises an unmonitored device 500 controlled by an unmonitored application 600, and the monitored domain 400 comprises a monitored device 700 controlled by a monitored application 800. The monitored application 800 can be run on a device in the monitored domain 400 (e.g. the monitored device 700 or another device in the monitored domain) that has the application stored in its memory for execution by that device via at least one processor of the device. The unmonitored application 600 can be run on a device in the unmonitored domain 300 (e.g. the unmonitored device 500 or another device in the unmonitored domain) that has the application stored in its memory for execution by that device via at least one processor of the device.

It will be noted that the unmonitored domain 300 may comprise a plurality of unmonitored devices, and the monitored domain 400 may comprise a plurality of monitored devices while in the drawing of the present exemplary embodiment only one unmonitored device 500 and one monitored device 700 are illustrated, for the sake of simplifying the principle underlying the invention. The overall domain 200 may comprise a PBX with monitored devices/extensions, and SIP-connected trunks that are not monitored. The unmonitored device 500 may in this case be a SIP trunk, the unmonitored application 600 may for example be an IVR application, and the monitored device 700 may be assigned to a contact center agent.

The process 1000 comprises a plurality of process steps. Numbering of steps is such that a first digit following a step indicator "S" indicates the process ("1" for "1000"), the second digit indicates the logical (or physical) instance where the respective step is located (e.g., "1" for Caller 100, "5" for unmonitored device 500, and so on), and the third and fourth digits indicate a step count in the process.

As shown in the FIGURE, process 1000 starts as a caller in the caller domain 100 calls the contact center exemplifying overall domain 200 (step S1102), and the call arrives at the unmonitored device 500 in unmonitored domain 300 (step S1504). Upon receipt of the call, the unmonitored device 500 transmits a Call Arrival Signal to the unmonitored application 600 controlling it (step S1512) (e.g. an application run by the unmonitored device or an application run on another device in the unmonitored domain, which (in some embodiments) can be configured to control the unmonitored device). On receipt of the Call Arrival Signal, the unmonitored application 600 requests a new call context from the monitored domain 400, by sending a RequestContext Message to the monitored application 800 controlling monitored device 700) (e.g. an application run by the monitored device 700 or an application run on another device in the monitored domain, which in some embodiments may be configured to control the monitored device 700), said RequestContext Message including called, calling, and redirect numbers contained in the call (step S1614.

Upon receipt of the RequestContext message, the monitored application 800 returns a new call context to the unmonitored application 600 (step S1816). The context information is now stored and can be referred to (and additional information can be associated and maintained as part of the call context). Hence, the call now exists within the scope of the monitored application, and can be referred to consistently using the call identifier.

To move the call from the unmonitored domain 300 to the monitored domain 400, the unmonitored application 600 first requests a unique call movement identifier, by sending a RequestTransfer message to the monitored application 800, said RequestTransfer message including the call context previously returned in step S1810 (step S1622). Upon receipt of the RequestTransfer message, the monitored application 800 returns a unique number to the unmonitored application 600 (step S1824). It will be noted that the unique number is generated to uniquely identify the call during this particular moving or transfer operation. The unique number of this invention is denoted by "UniqueNumber" in the FIGURE.

Upon receipt of the unique number, the unmonitored application 600 instructs its unmonitored device 500 to move the call to the monitored domain 400, by sending a TransferCall message to the unmonitored device 500, said TransferCall message including the called and calling numbers of the call, and the unique number (step S1632). It is noted that the unique number is specified in a SIP diversion header, and is therefore available when the call is received in the monitored domain. The unique number is thus not used as the target of the transfer. Upon receipt of the TransferCall message, the unmonitored device 500 moves the call to the monitored device 700 (step S1534). Upon receipt of the call, the monitored device 700 transmits a Call Arrival signal to the monitored application 800 (step S1736). Upon receipt of the Call Arrival signal, the monitored application 800 reconciles the call, using the unique number specified in the SIP diversion header (step S1838). By reconciliation, the monitored application 800 determines the call context for the call, i.e., looks up the previously assigned call context, based on the information signalled when the call arrived at the monitored device 700, including the unique number.

Even if not shown in the drawing, when that movement of the call is completed (which may be recognized and verified by the monitored application 800 and/or unmonitored application 600, the unique number is discarded, i.e., becomes free for other use. During the movement, the monitored application 800 and/or unmonitored application 600 ensure that the unique number is not used for any move of any other call at the same time.

After a period of time, the call is to be moved back to the unmonitored domain 300. For that, the monitored application 800 instructs its monitored device 700 to perform transfer of the call, by sending a TransferCall message which includes a redirection number RN and a unique number which is newly created for the new movement to uniquely identify this particular call movement and may therefore not be the same number as was previously used, to monitored device 700 (step S1824). As the monitored device 700 receives the TransferCall message, it moves the call to the unmonitored device 500 (step S1744).

In some cases, the unique number may alternatively be the same unique number as transmitted in step S1824, but preferably a new unique number would be created. In any case, the unique number is generated to uniquely identify the call, and to uniquely link the identifier to the call context in the monitored domain. In other words, when the call is being moved from the monitored domain to the unmonitored domain, to move the call, the monitored application tells the monitored device to transfer the call to a specific number which contains a prefix followed by the unique number that was just allocated. Practically speaking, the prefix is what is actually used to move the call to the unmonitored resource; the unique number consists of additional digits which can be interpreted by the unmonitored application, and then passed back when asking for the call context.

Upon receipt of the call, the unmonitored device 500 sends a Call Arrival signal to its unmonitored application 600 (step S1552). Upon receipt of the Call Arrival signal, the unmonitored device 600 requests call context from the monitored domain 400, by sending a RequestContext message to the monitored application 800, the RequestContext message including Calling and Redirect number "RN" as well as the new unique number, to the monitored application 800 (step S1654). Upon receipt of the RequestContext message, at this instance, the monitored application 800 returns the existing call context of the call to the unmonitored application 600 (step S1856). In other words, when the call is received by the unmonitored application (from the monitored domain), it looks at the information contained within the TO header field for the called number. The TO header field contains the called number and the called number contains the unique number. In this case, the called number in the TO header field is the prefix followed by unique number. So at this point, the called number contains the unique number.

Again, even if not shown in the drawing, when that movement of the call is completed (which may be recognized and verified by the monitored application 800 and/or unmonitored application 600), the unique number is discarded, i.e., becomes free for other use. During the movement, the monitored application 800 and/or unmonitored application 600 ensure that the unique number is not used for any move of any other call at the same time.

Conventionally, calls may be moved from monitored to unmonitored domains and vice versa or between two monitored domains crossing an unmonitored domain, which ends up in the call being divided into multiple contexts. According to the process 1000 described above, unmonitored application 600 is running in the unmonitored domain 300 (e.g. an unmonitored IVR). If a new call arrives in the unmonitored domain 300, the unmonitored application 600 running in the unmonitored domain 300 forwards the called number, the calling number and any redirection numbers to the monitored application 800 running in the monitored domain 400 and queries for a new call context. In order to transfer a call to the monitored domain 400, the unmonitored application 600 running in the unmonitored domain 300 requests a temporary unique number for this call from the monitored application 800 running in the monitored domain 400. This unique number is put into the diversion header of a SIP message. The monitored application 700 in the monitored domain 400 is now able to identify the call as it arrives in the monitored domain 400 and to assign the correct call context. The other way round, if a call is to be routed from the monitored domain 400 into an unmonitored domain 300, a (another) unique number is appended to a route prefix. The unmonitored application 600 in the unmonitored domain 300 then queries the monitored application 800 in the monitored domain 400 to obtain the existing call context. The solution described above is different from a global call ID which cannot be maintained while the call is moved between unmonitored and monitored domains (and vice versa), and therefore cannot be used to uniquely identify a call after the call is moved from a monitored domain into an unmonitored domain. Use of unique numbers while calls are moved into, out of or across unmonitored domains according to the present invention ensures that a single unique call context per call can be maintained and accessed throughout the call lifecycle.

The present invention as exemplified above and claimed makes use of both a called number and information in the diversion header to uniquely identify a call thus allowing the context to be maintained as the call moves between monitored and unmonitored devices that are connected via a SIP trunk. A SIP diversion header may be used when the call is moved from the unmonitored domain to the monitored domain.

If a new call arrives in the unmonitored domain, an application running in the unmonitored domain will query the application running in the monitored domain for a new call context by passing in the called, calling and redirection numbers.

To move the call from the unmonitored domain to the monitored domain, the application running in the unmonitored domain will request a temporary unique number from the application running in the monitored domain that will uniquely identify the call when transferring it to the monitored domain. This unique number is used in the diversion header, in particular in the SIP diversion header The application running in the monitored domain will use this information to reconcile the call once it physically arrives in the monitored domain.

To move the call from the monitored domain back to the unmonitored domain, the application running in the monitored domain will allocate a unique number that is appended to a route prefix that allows the call to be routed to the device in the unmonitored domain. When the call arrives in the unmonitored domain, it queries the application running in the monitored domain for the call context by passing in the called, calling and redirection numbers. Since the called number contains the unique number, the existing call context is returned.

In summary, embodiments of the invention can use the features of SIP trunking in combination with both the "To" number and SIP diversion header to allow call reconciliation between monitored and unmonitored domains.

The ability to maintain the call context while the call physically moves between the monitored and unmonitored domains ensures that the call context is maintained for the life of the call in the overall domain. This also advantageously enables proper statistics and handling of the call.

Obviously, various applications of the present invention may become apparent to the person skilled in the art, based on the information disclosed in the present specification, which might not be mentioned explicitly but are fully covered by the scope of the present application.

In an alternative example, the SIP header could be extended to provide an identifier that uniquely identifies the session. It is to be noted that the SIP call-ID is not appropriate for this use as a two-step transfer would result in a second call-ID. In this alternative, instead of using the unique identifier or number as the number that is used to transfer the call to (or as part of the number to transfer the call to), it would be specified directly using a new field in the SIP header. It is to be noted in this case that, as the SIP header is a standard, introducing a proprietary extension to the SIP header which is only used or recognized by a few components would limit the applicability of the solution and would therefore require each PBX to be modified appropriately. Therefore, a technical feature or several technical features which has/have been disclosed with respect to a single or several embodiments disclosed herein before may be present also in another embodiment except it is/they are specified not to be present or it is impossible for it/them to be present for technical reasons.

The invention is generally applicable to any fields of communication. However, embodiments of the invention can be based on elements of the SIP, details of which may be referred to according to Internet Engineering Task Force (IETF) standard recommendation, Request for Comments 3261 (i.e. RFC 3261).

The unique number can be provided differently for different call movements. In other words, the unique number is a temporary number which is used while the call is being moved from the unmonitored domain to the monitored domain (or vice versa, from the monitored domain to the unmonitored domain). The unique number is associated with the call context that is generated in the monitored application. The call context contains the called number, calling number, and redirection device information for the call when it arrived in the system. The called number, calling number, and redirection device information may change as the call is moved around. When redirection devices change as the call is moved the unique number may also change as it is generated and allocated for a particular call movement operation, and is only used for that particular movement. If the call needs to be moved again, another unique number will be generated and allocated. In any case, the call context is maintained by the monitored application, and at any one point a call identifier or unique number may be directly mapped to a call context in the monitored application. On the other hand, the call identifier is fixed for the lifecycle of the call and does not change when redirection devices change.

As described herein, the unique number can be in the form of a number, by definition. However, any alphanumeric character string may be used to identify a call move, in the sense of the unique number. For example, when the call is moved from the unmonitored to the monitored domain, the telephony platform may expect to receive a numeric identifier in form of the alphanumeric character string. In yet other embodiments, another type of character string may be utilized for the unique number.

Embodiments of the invention may be modified to account for different sets of criteria. For example, the size and configuration of an unmonitored domain and/or a monitored domain can be any suitable arrangement that may meet a particular set of design criteria or communication services objectives. Thus, while certain present preferred embodiments of a communication device, communication system, non-transitory computer readable medium, and methods of making and using the same have been shown and described above, it is to be distinctly understood that the invention is not limited thereto but may be otherwise variously embodied and practiced within the scope of the following claims.

What is claimed is:

1. An apparatus for handling a call that is moveable within a system between at least one unmonitored domain of the system and at least one monitored domain of the system, said apparatus comprising:
a first communication device having a processor and non-transitory memory, wherein the first communication device is within a monitored domain of the system;
the first communication device configured to determine a call context of a first call upon first arrival of said first call into said system;
the first communication device configured to generate a first unique number to be temporarily used for a first movement of said first call between an unmonitored domain of the system and the monitored domain of the system based on said call context, the first unique number generated to avoid use of the first unique number in a move of any other call within the system at a same time as the first movement of the first call; and
wherein the first unique number is configured so that the first call is moveable to a second communication device within the unmonitored domain.

2. The apparatus of claim 1, wherein the apparatus also comprises:
the second communication device within the unmonitored domain.

3. The apparatus of claim 2, wherein the second communication device is configured to request the first unique number from the first communication device by sending the call context from the first call to the first communication device to enable the first communication device to generate said first unique number based on the call context of the first call.

4. The apparatus of claim 3, wherein the first communication device is configured to generate said first unique number and transmit said first unique number to said second communication device in response to the request for the first unique number; and
the second communication device is configured to receive said first unique number and use the first unique number by adding said first unique number to a diversion header of said first call for the first movement.

5. The apparatus of claim 2, wherein the first communication device is a telephone, a mobile phone, a smart phone, a server, a telephone server, an exchange, a gateway, a private branch exchange, a desktop computer, a portable computer, a tablet, a communication terminal, or a node of a network; and
the second communication device is a telephone, a mobile phone, a smart phone, a server, a telephone server, an exchange, a gateway, a private branch exchange, a desktop computer, a portable computer, a tablet, a communication terminal, or a node of a network.

6. The apparatus of claim 1, wherein the first communication device is configured to append said first unique number to a route prefix of said first call for the first movement when the first call is to be moved from said monitored domain to said second communication device for the first movement.

7. The apparatus of claim 1, wherein the first communication device is a telephone, a mobile phone, a smart phone, a server, a telephone server, an exchange, a gateway, a private branch exchange, a desktop computer, a portable computer, a tablet, a communication terminal, or a node of a network.

8. A method of handling a first call to be moved within a system having an unmonitored domain and a monitored domain, the method comprising:
a first communication device determining a call context of a first call upon first arrival of said first call into said system, the first communication device having a processor and non-transitory memory, wherein the first communication device is within the monitored domain of the system;
the first communication device generating a first unique number to be temporarily used for a first movement of said first call between an unmonitored domain of the system and the monitored domain of the system based on said call context, the first unique number generated to avoid use of the first unique number in a move of any other call within the system at a same time as the first movement of the first, wherein the first unique number is configured so that the first call is moveable to a second communication device within the unmonitored domain.

9. The method of claim 8, wherein the first communication device is a telephone, a mobile phone, a smart phone, a server, a telephone server, an exchange, a gateway, a private branch exchange, a desktop computer, a portable computer, a tablet, a communication terminal, or a node of a network.

10. The method of claim 8, comprising:
upon first arrival of said first call in said system, providing a call context of said first call based on a called number, a calling number, and any redirection number included in said first call.

11. The method of claim 10, comprising:
requesting said call context from said monitored domain based on at least one of said first unique number, a calling number, and any redirection number included in said first call upon arrival of said first call at said unmonitored domain during the first movement when the first call is to be moved from the monitored domain to the unmonitored domain for the first movement.

12. The method of claim 11, comprising:
providing said requested call context to the unmonitored domain.

13. The method of claim 12, wherein said providing said requested call context comprises:
identifying said first unique number at said monitored domain,
selecting existing call context of said call allocated to said first unique number,
transmitting said selected existing call context to said unmonitored domain, and
receiving said transmitted call context at said unmonitored domain.

14. The method of claim 8, comprising:
discarding said first unique number after said first movement is completed such that the first unique number is usable for a second movement of a second call while the first call is ongoing after the first movement is completed.

15. The method of claim 8, comprising:
creating said call context at said monitored domain based on a called number, a calling number and any redirection number included in said first call.

16. The method of claim 8, wherein said call is first received in said unmonitored domain, the method further comprising:
requesting said call context from said monitored domain by passing in said called number, calling number, and any redirection number included in said first call,
creating said call context at said monitored domain based on said passed-in called number, calling number and any redirection number,
transmitting said created call context to said unmonitored domain, and
receiving said transmitted call context at said unmonitored domain.

17. The method of claim 16, comprising:
reconciling, upon arrival of said first call from said unmonitored domain at said monitored domain, based on said first unique number at said monitored domain.

18. A non-transitory computer readable medium having an application stored therein, the application comprising program code that defines a method to be performed by a first communication device that executes the application, the method comprising:
the first communication device determining a call context of a first call in response to a first arrival of said first call into said system, wherein the first communication device is within a monitored domain of the system;
the first communication device generating a first unique number to be temporarily used for a first movement of said first call between an unmonitored domain of the system and the monitored domain of the system based on said call context, the first unique number generated to avoid use of the first unique number in a move of any other call within the system at a same time as the first movement of the first, wherein the first unique number is configured so that the first call is moveable to a second communication device within the unmonitored domain.

19. The non-transitory computer readable medium of claim 18, wherein the method also comprises:
appending the generated first unique number to a route prefix of said first call for the first movement when the first call is to be moved from said monitored domain to said unmonitored domain for the first movement of said first call between said unmonitored domain and said monitored domain.

20. The non-transitory computer readable medium of claim 19, wherein the system is a communication system and the device is a telephone, a mobile phone, a smart phone, personal digital assistant, a server, a telephone server, an exchange, a gateway, a private branch exchange, a workstation, a desktop computer, a portable computer, an electronic tablet, a communication terminal, a communication device, or a node of a network of the system.

* * * * *